US006968331B2

(12) United States Patent
Bar-Yossef et al.

(10) Patent No.: US 6,968,331 B2
(45) Date of Patent: Nov. 22, 2005

(54) METHOD AND SYSTEM FOR IMPROVING DATA QUALITY IN LARGE HYPERLINKED TEXT DATABASES USING PAGELETS AND TEMPLATES

(75) Inventors: Ziv Bar-Yossef, Albany, CA (US); Sridhar Rajagopalan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 10/055,586

(22) Filed: Jan. 22, 2002

(65) Prior Publication Data

US 2003/0140307 A1 Jul. 24, 2003

(51) Int. Cl.$^7$ ............................. G06F 17/30; G06F 7/00
(52) U.S. Cl. ...................... 707/2; 715/501.1; 715/513
(58) Field of Search ................................ 707/1–104.1; 715/501.1, 513

(56) References Cited

U.S. PATENT DOCUMENTS

| | | | | |
|---|---|---|---|---|
| 5,909,677 | A | * | 6/1999 | Broder et al. ................... 707/3 |
| 6,119,124 | A | * | 9/2000 | Broder et al. ............ 707/103 R |
| 6,138,113 | A | * | 10/2000 | Dean et al. ...................... 707/2 |
| 6,230,155 | B1 | * | 5/2001 | Broder et al. ................... 707/3 |
| 6,349,296 | B1 | * | 2/2002 | Broder et al. ................... 707/3 |
| 6,614,764 | B1 | * | 9/2003 | Rodeheffer et al. ......... 370/254 |
| 6,615,209 | B1 | * | 9/2003 | Gomes et al. .................. 707/5 |
| 6,658,423 | B1 | * | 12/2003 | Pugh et al. .................. 707/102 |
| 6,665,837 | B1 | * | 12/2003 | Dean et al. .............. 715/501.1 |

OTHER PUBLICATIONS

Manber, U. "Finding Similar Files in a Large File System", Technical Report TR 93-33, University of Arizona, Department of Computer Science, Oct. 1993.*

Broder, A.Z. "Some Applications of Rabin's Fingerprinting Method", in R. Capocelli, A. De Santis, U. Vaccaro (eds), "Sequence II: Methods in Communications, Security and Computer Science", Springer-Verlag, 1993.*

Agrawal, R. and R. Srikant "Fast Algorithms for Mining Association Rules", Proceedings of the 20$^{th}$ VLDB Conference, pp. 487 499, 1994.*

Brin, S., J. Davis and H. Garcia-Molina "Copy Detection Mechanisms for Digital Documents", Proceedings of the ACM SIGMOD Conference, pp. 398-409, May 1995.*

Heintze, N. "Scalable Document Fingerprinting (Extended Abstract)", Proceedings of the 1996 USENIX Workshop on Electroni Commerce, Nov. 1996.*

Broder, A.Z. "On the Resemblance and Containment of Documents", Proceedings of Compression and Complexity of SEQUENCES, p. 21, Jun. 11-13, 1997.*

Broder, A.Z., S.C. Glassman, M.S. Manasse and G. Zweig "Syntactic Clustering of the Web", Proceedings of the 6$^{th}$ International World Wide Web (WWW) Conference (WWW6), pp. 1157-1166, 1997.*

Fang, M., N. Shivakumar, H. Garcia-Molina, R. Motwani and J.D. Ullman "Computing Iceberg Queries Effectively", Proceeding of the 24$^{th}$ VLDB Conference, 1998.*

(Continued)

*Primary Examiner*—Luke S Wassum
(74) *Attorney, Agent, or Firm*—Jose Gutman; Fleit, Kain, Gibbons, Gutman, Bongini & Bianco P.L.

(57) ABSTRACT

A computing system and method clean a set of hypertext documents to minimize violations of a Hypertext Information Retrieval (IR) rule set. Then, the system and method performs an information retrieval operation on the resulting cleaned data. The cleaning process includes decomposing each page of the set of hypertext documents into one or more pagelets; identifying possible templates; and eliminating the templates from the data. Traditional IR search and mining algorithms can then be used to search on the remaining pagelets, as opposed to the original pages, to provide cleaner, more precise results.

18 Claims, 12 Drawing Sheets

OTHER PUBLICATIONS

Kumar, R., P. Raghavan, R. Rajagopalan and A. Tomkins "Trawling the Web for Emerging Cyber-Communities", Proceedings the 8th International World Wide Web (WWW) Conference (WWW8), pp. 1481-1493, 1999.*

W3C "Document Object Model (DOM) Level 2 Core Specification Version 1.0, W3C Recommendation Nov. 13, 2000", downloaded from www.w3.org.*

Davidson, B.D. "Recognizing Nepotistic Links on the Web", Proceedings of the AAAI-2000 Workshop on Artificial Intelligence fo Web Search, pp. 23-28, 2000.*

Chakrabarti, S., M. Joshi and V. Tawde "Enhanced Topic Distillation Using Text, Markup Tags and Hyperlinks", Proceedings o the ACM SIGIR Conference, Sep. 9-12, 2001.*

Crescenzi, V., G. Mecca and P. Merialdo "RoadRunner: Towards Automatic Data Extraction from Large Web Sites", Proceedings of the 27th VLDB Conference, 2001.*

Bar-Yossef, Z. and S. Rajagopalan "Template Detection via Data Mining and its Applications", Proceedings of the WWW2002 Conference, pp. 580-591, May 7-11, 2002.*

Haveliwala, T.H., A. Gionis, D. Klein and P. Indyk "Evaluating Strategies for Similarity Search on the Web", Proceedings of the WWW2002 Conference, May 7-11, 2002.*

Crescenzi, V., G. Mecca and P. Merialdo "RoadRunner: Automatic Data Extraction from Data-Intensive Web Sites", Proceedin of the ACM SIGMOD Conference, p. 624, Jun. 4-6, 2002.*

Laender, A.H.F., B.A. Ribeiro-Neto, A.S. da Silva and J.S. Teixeira "A Brief Survey of Web Data Extraction Tools", SIGMOD Record, vol. 31, No. 2, pp. 84-93, Jun. 2002.*

Arasu, A. and H. Garcia-Molina "Extracting Structured Data from Web Pages", Proceedings of the ACM SIGMOD Conference, Jun. 9-12, 2003.*

Yi, L., B. Liu and X. Li "Eliminating Noisy Information in Web Pages for Data Mining", Proceedings of the ACM SIGKDD Conference, Aug. 24-27, 2003.*

Ma, L., N. Goharian, A. Chowdhury and M. Chung "Extracting Unstructured Data from Template Generated Web Documents", Proceedings of the 12[the] International Conference on Information and Knowledge Management, pp. 512-515, Nov. 3-8, 2003.*

Huang, L. "A Survey on Web Information Retrieval Technologies", Technical Report TR-120, Experimental Computer Systems Lab (ECSL), Department of Computer Science, SUNY Stony Brook, Feb. 2000.*

Bharat, K. and A. Broder "Mirror, Mirror on the Web: A Syudy of Host Pairs with Replicated Content", Proceedings of the 8th International Conference on the World Wide Web (WWW99), May 1999.*

Shivakumar, N. and H. Garcia-Molina "SCAM: A Copy Detection Mechanism for Digital Documents", Proceedings of the 2nd Annual Conference on Theory abd Practice of Digital Libraries, Jun. 1995.*

Broder, A.Z., Glassman, S.C. and Manasse, M.S., "Syntactic Clustering of the Web," In Proceedings of the 6th International World Wide Web Conference (WWW6), pp. 1157-1166, 1997.

Bharat, K. and Henzinger, M.R., "Improved Algorithms for Topic Distillation in a Hyperlinked Environment," In Proceedings of the 21st Annual International ACM SIGIR Conference on Research and Development in Information Retrieval, pp. 104-111, 1998.

Brin, S. and Page, L., "The Anatomy of a Large-Scale Hypertextual Web Search Engine," In Proceedings of the 7th International World Wide Web Conference (WWW7), pp. 107-117, 1998.

Chakrabarti, S., Dom, B.E., Gibson, D., Kleinberg, J.M., Raghavan, P. and Rajagopalan, S., "Automatic Resource List Compilation by Analyzing Hyperlink Structure and Associated Text," In Proceedings of the 7th International World Wide Web Conference (WWW7), pp. 65-74, 1998.

Chakrabarti, S., Dom, B.E., Gibson, D., Kleinberg., J.M., Kumar, S.R., Raghavan, P., Rajagopalan, S. and Tomkins, A., "Hypersearching the Web," Scientific American, Jun. 1999.

Chakrabarti, S., Dom, B. and Indyk, P., "Enhanced Hypertext Categorization Using Hyperlinks," In SIGMOD 1998, Proceedings ACM SIGMOD International Conference on Management of Data, pp. 307-318, 1998.

Chakrabarti, S., van den Berg, M. and Dom, B.E., "Distributed Hypertext Resource Discovery through Examples,", In Proceedings of the 25th International Conference on Very Large Databases (VLDB), pp. 375-386, 1999.

Chakrabarti S., van den Berg, M. and Dom, B.E., "Focused Crawling: A New Approach to Topic-Specific Web Resource Discovery," In Proceedings of the 8th International World Wide Web Conference (WWW8), pp. 1623-1640, 1999.

Davison, B.D., "Recognizing Nepoistic Links on the Web," In Proceedings of the AAAI-2000 Workshop on Artificial Intelligence for Web Search, pp. 23-28, 2000.

Dean, J. and Henzinger, M.R., "Finding Related Pages in the World Wide Web," In Proceedings of the 8th International World Wide Web Conference (WWW8), pp. 1467-1479, 1999.

Gibson, D. Kleinberg, J.M. and Raghavan, P., "Inferring Web Communities from Link Topology," In Proceedings of the 9th ACM Conference on Hypertext and Hypermedia, pp. 225-234, 1998.

Google. Google. http://www.google.com.

Kleinberg, J.M., "Authoritative Sources in a Hyperlinked Environment," Journal of the ACM, pp. 604-632, 1999.

Kumar, R., Raghavan, P., Rajagopalan, S. and Tomkins, A., "Trawling the Web for Emerging Cyber-Communities," In Proceedings of the 8th International World Wide Web Conference (WWW8), pp. 1481-1493, 1999.

Lempel, R. and Moran, S., "The Stochastic Approach for Link-Structure Analysis (SALSA) and the TKC Effect," In Proceedings of the 9th International World Wide Web Conference (WWW9), pp. 387-401, 2000.

Maarek, Y.S., Berry, D.M. and Kaiser, G.E., "An Information Retrieval Approach for Automatically Constructing Software Libraries," Transactions on Software Engineering, 17(8):800-813, 1991.

Modha, D.S. and Spangler, W.S., "Clustering Hypertext with Applications to Web Searching," In Proceedings of the ACM Hypertext 2000 Conference, pp. 143-152, 2000.

Albert, R., Jeong, J. and Barabasi, A.-L., "The Diameter of the World Wide Web," Nature, 401:130-131, 1999.

* cited by examiner

METHOD AND SYSTEM FOR IMPROVING DATA QUALITY IN LARGE HYPERLINKED TEXT DATABASES USING PAGELETS AND TEMPLATES

BACKGROUND OF THE INVENTION

1. Field of the Invention

This invention generally relates to the field of computer based search systems, and more particularly relates to a system and method for improving data quality in large hyperlinked text databases using pagelets and templates, and to the use of the cleaned data in hypertext information retrieval algorithms.

2. Description of Related Art

The explosive growth of content available on the World-Wide-Web has led to an increased demand and opportunity for tools to organize, search and effectively use the available information. People are increasingly finding it difficult to sort through the great mass of content available. New classes of information retrieval algorithms—link-based information retrieval algorithms—have been proposed and show increasing promise in addressing the problems caused by this information overload.

Three important principles (or assumptions)—collectively called Hypertext IR Principles—underlie most, if not all, link-based methods in information retrieval.

1. Relevant Linkage Principle: Links confer authority; by placing a link from a page p to a page q, the author of p recommends q or at least acknowledges the relevance of q to the subject of p.

2. Topical Unity Principle: Documents co-cited within the same document are related to each other.

3. Lexical Affinity Principle: Proximity of text and links within a page is a measure of the relevance of one to the other.

Each of these principles, while generally true, is frequently and systematically violated on the web. Moreover, these violations have an adverse impact on the quality of results produced by linkage based search and mining algorithms. This necessitates the use of several heuristic methods to deal with unreliable data that degrades performance and overall quality of searching and data mining.

Therefore a need exists to overcome the problems with the prior art as discussed above, and particularly for a method of cleaning the data prior to a search and eliminating violations of hypertext information retrieval principles.

SUMMARY OF THE INVENTION

According to a preferred embodiment of the present invention, a computing system and method clean a set of text documents to minimize violations of Hypertext IR Principles as a preparation step towards running an information retrieval/mining system. The cleaning process includes first, decomposing each page of the set of text documents into one or more pagelets; second, identifying possible templates; and finally, eliminating the templates from the data. Traditional IR search and mining algorithms can then be used to process the remaining data, as opposed to the original pages, to provide more precise results.

DESCRIPTION OF THE PREFERRED EMBODIMENTS

The present invention, according to a preferred embodiment, overcomes problems with the prior art by "cleaning" the underlying data so that violations of Hypertext Information Retrieval (IR) Principles are minimized, then applying conventional IR algorithms. This results in higher precision, better scalability, and more understandable algorithms for link-based information retrieval.

A preferred embodiment of the present invention presents a formal framework and introduces new methods for unifying a large number of these data cleaning heuristics. The violations of the hypertext information retrieval principles result in significant performance degradations in all linkage based search and mining algorithms. Therefore, eliminating these violations in a preprocessing step will result in a uniform improvement in quality across the board.

The web contains frequent violations of the Hypertext IR Principles. These violations are not random, but rather happen for systematic reasons. The web contains many navigational links (links that help navigating inside a website), download links (links to download pages, for instance, those which point to a popular Internet browser download page), links which point to business partners, links which are introduced to deliberately mislead link-based search algorithms, and paid advertisement links. Each of these auxiliary links violates the Relevant Linkage Principle. In algorithmic terms, these are a significant source of noise that search algorithms have to combat, and which can sometimes result in non-relevant pages being ranked as highly authoritative. An example of this would be that a highly popular, but very broad, homepage (e.g., Yahoo!) is ranked as a highly authoritative page regardless of the query because many pages contain a pointer to it.

Another common violation occurs from pages that cater to a mixture of topics. Bookmark pages and personal homepages are particularly frequent instances of this kind of violation. For example, suppose that a colleague is a fan of professional football, as well as an authority on finite model theory. Further that these two interests are obvious from his homepage. Some linkage based information retrieval tools will then incorrectly surmise that these two broad topics are related. Since the web has a significantly larger amount of information about professional football than it has about finite model theory, it is possible, even probable, that a link-based search for resources about finite model theory returns pages about pro football.

Another issue arises from the actual construction of the web pages. HTML is a linearization of a document; however, the true structure is most like a tree. For constructs such as a two dimensional table, trees are not effective descriptions of document structure either. Thus, lexical affinity should be judged on the real structure of the document, not on the particular linearization of it as determined by the conventions used in HTML. Additionally, there are many instances of lists that are arranged in alphabetical order within a page. Assuming that links that are close to each other on such a list are more germane to each other than otherwise would be wrong.

Modern web pages contain many elements for navigational and other auxiliary purposes. For example, popular web sites tend to contain advertisement banners, shopping lists, navigational bars, privacy policy information, and even news headlines. Many times, pages represent a collection of interests and ideas that are loosely knit together to form a single entity (i.e., a person's work and relevant information about his hobbies may appear on a homepage). These pages may be broken down into self-contained logical regions called pagelets. Each pagelet has a well-defined topic or functionality. Pagelets are the more appropriate unit for information retrieval, since they tend to better conform to the Hypertext IR Principles.

The proliferation of the use of templates in creating web pages has also been a source of Hypertext IR Principles violations. A template is a pre-prepared master HTML shell page that is used as a basis for composing new web pages. The content of the new page is plugged into the template shell, resulting in a collection of pages that share a common look and feel. Templates can spread over several sister sites and contain links to other web sites. Since all pages that conform to a common template share many links, it is clear that these links cannot be relevant to the specific content on these pages.

According to a preferred embodiment of the invention, each page from a collection of documents is decomposed into one or more pagelets. These pagelets are screened to eliminate the ones that belong to templates. Traditional IR algorithms can then be used on the remaining pagelets to return a more precise result set. The collection of documents may reside locally; be located on an internal LAN; or may be the collection or a subset of the collection of documents located on the World Wide Web.

Figure 1:
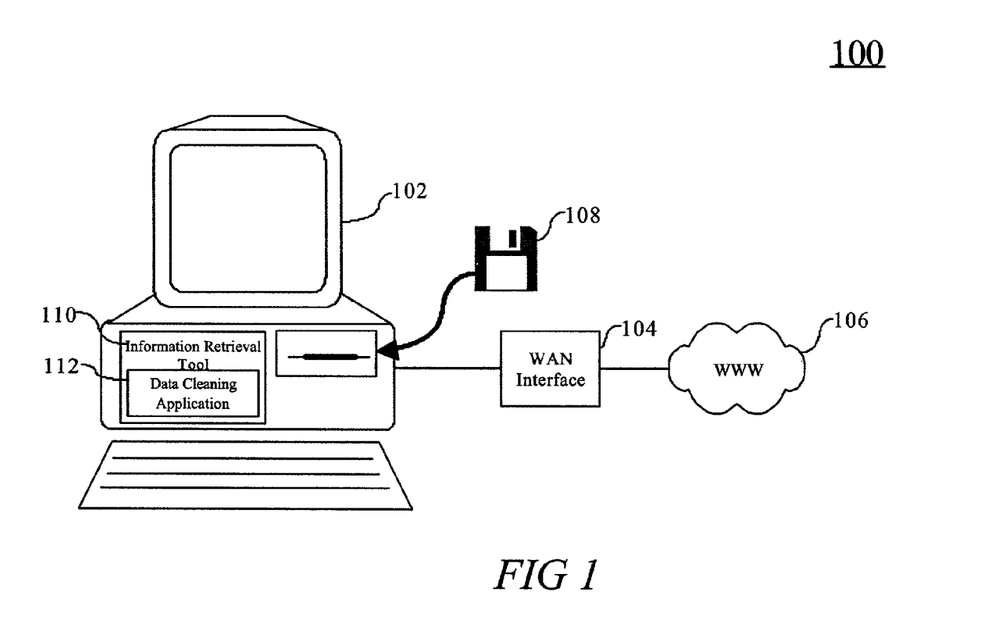
FIG. 1 is a block diagram illustrating an information retrieval tool containing a data cleaning application in a computer system in accordance with a preferred embodiment of the present invention.
Figure 2:
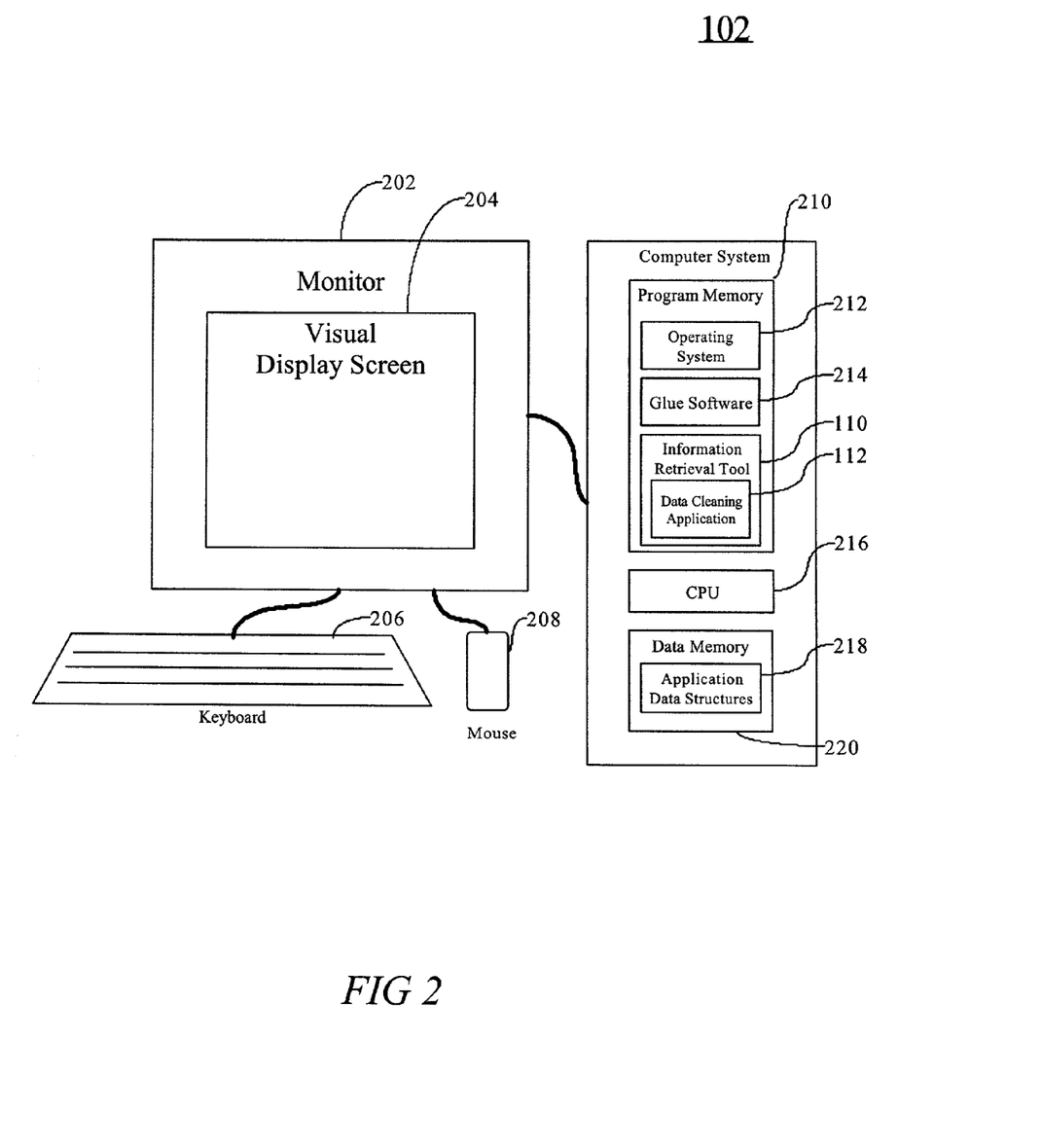
FIG. 2 is a more detailed block diagram showing a computer system in the system of FIG. 1, according to a preferred embodiment of the present invention.

FIGS. 1 and 2 illustrate an exemplary information retrieval tool containing a data cleaning application according to a preferred embodiment of the present invention. The information retrieval tool with a data cleaning application 100 comprises a computer system 102 having an information retrieval tool 110 containing a data cleaning application 112. Computer system 102 may be communicatively coupled with the world-wide-web 106, via a wide area network interface 104. The wide area network interface 104 may be a wired communication link or a wireless communication link. Additionally, computer system 102 may also be communicatively coupled with a local area network (not shown) via a wired, wireless, or combination of wired and wireless local area network communication links (not shown).

Each computer system 102 may include, inter alia, one or more computers and at least a computer readable medium 108. The computers preferably include means for reading and/or writing to the computer readable medium. The computer readable medium allows a computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems.

The computer system 102, according to the present example, includes a controller/processor 216 (shown in FIG. 2), which processes instructions, performs calculations, and manages the flow of information through the computer system 102. Additionally, the controller/processor 216 is communicatively coupled with program memory 210. Included within program memory 210 are an information retrieval tool 110 with a data cleaning application 112 (which will be discussed later in greater detail), operating system platform 212, and glue software 214. The operating system platform 212 manages resources, such as the data stored in data memory 220, the scheduling of tasks, and processes the operation of the information retrieval tool 110 and the data cleaning application 112 in the program memory 210. The operating system platform 212 also manages a graphical display interface (not shown), a user input interface (not shown) that receives inputs from the keyboard 206 and the mouse 208, and communication network interfaces (not shown) for communicating with the network link 104. Additionally, the operating system platform 212 also manages many other basic tasks of the computer system 102 in a manner well known to those of ordinary skill in the art.

Glue software 214 may include drivers, stacks, and low level application programming interfaces (API's) and provides basic functional components for use by the operating system platform 212 and by compatible applications that run on the operating system platform 212 for managing communications with resources and processes in the computing system 102.

Figure 3:
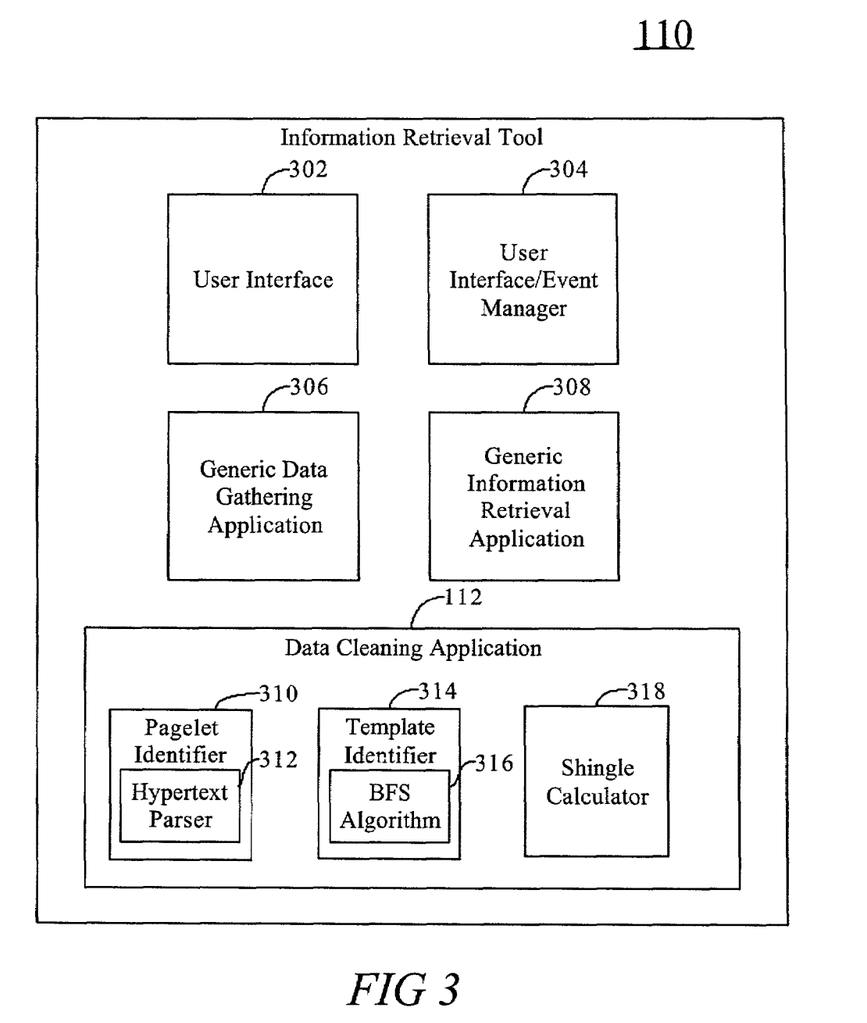
FIG. 3 is a more detailed block diagram showing an information retrieval tool containing a data cleaning application in the system of FIG. 1, according to a preferred embodiment of the present invention.
Figure 4:
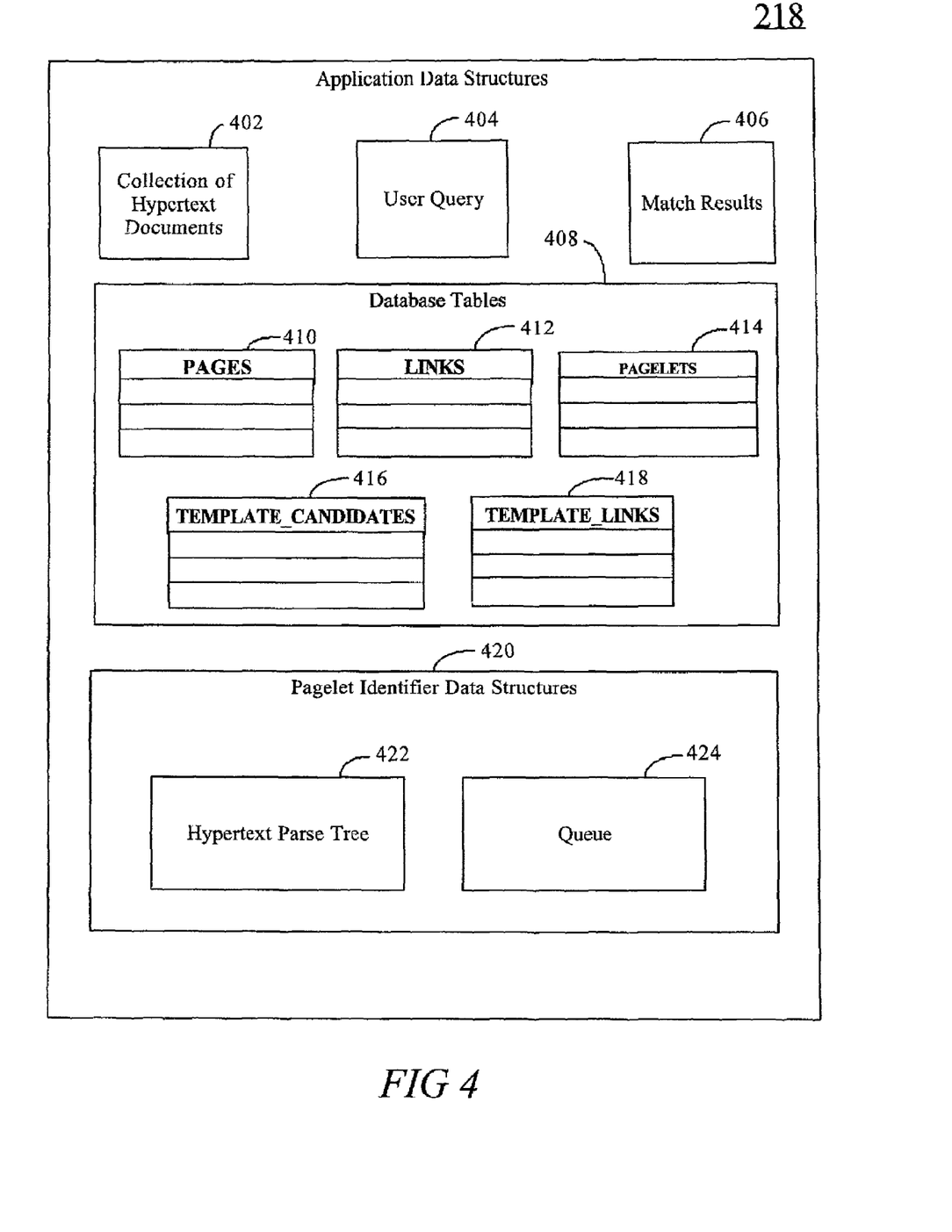
FIG. 4 is a more detailed block diagram of the application data structures in the system shown in FIG. 2, according to a preferred embodiment of the present invention.

FIGS. 3 and 4 illustrate the exemplary information retrieval tool 110 with a data cleaning application 112 and the application data structures 218 according to a preferred embodiment of the present invention. The user interface/event manager 304 is structured to receive all user interface 302 events, such as mouse movements, keyboard inputs, drag and drop actions, user selections, and updates to the display 204. User interface/event manager 304 is also structured to receive match results 406, from the generic information retrieval application 308, which will be discussed subsequently, representing the results for a user initiated request. These results are then displayed to the user via the display 204.

The information retrieval tool 110 can work with a generic data gathering application 306 (such as a web crawler) and a generic hypertext information retrieval application 308 (such as a search engine, a similar page finder, a focused crawler, or a page classifier). The data gathering application 306 fetches a collection of hypertext documents 402. These documents can be fetched from the Word-Wide Web 106, from a local intranet network, or from any other source. The documents are stored on database tables 408. The information retrieval application 308 processes the collection of hypertext documents 402 stored on the database tables 408, and based on a user's query 404 extracts results 406 from this collection matching the query. For example, when the information retrieval application 308 is a search engine, the application finds all the documents in the collection 402 that match the query terms given by the user.

Figure 12:
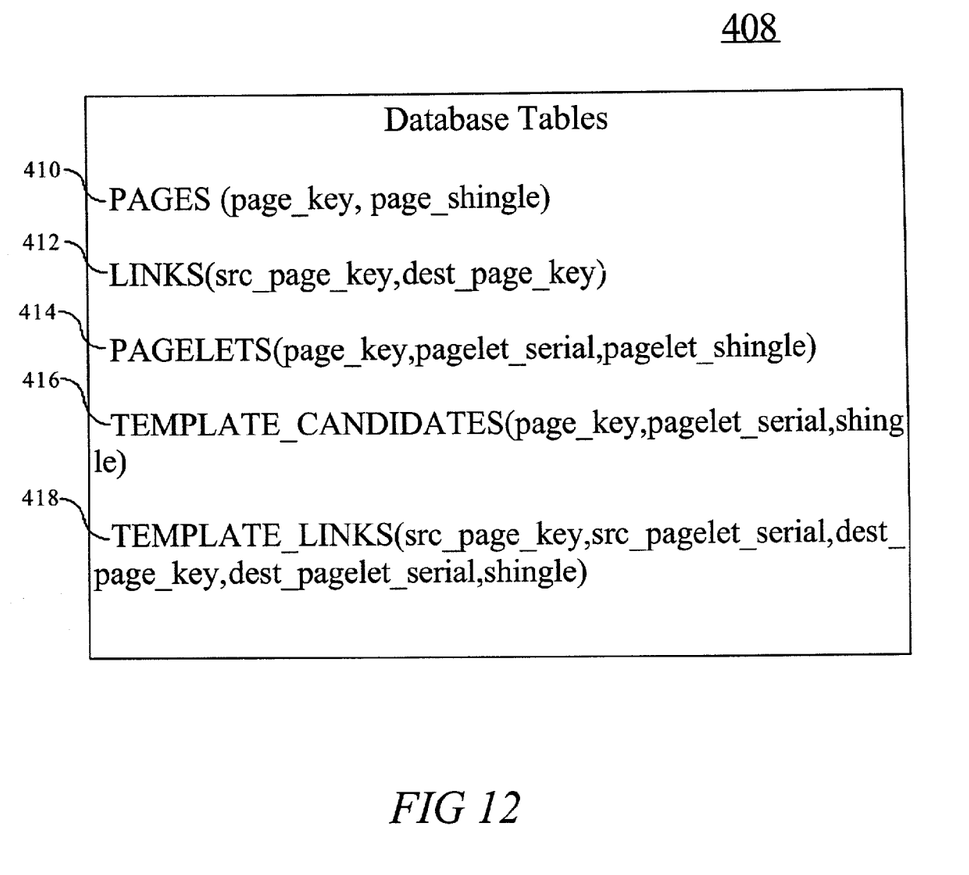
FIG. 12 is an exemplary database table structure of a set of hypertext documents according to a preferred embodiment of the present invention.

The data cleaning application 112 processes the collection of hypertext documents 402 stored on the database tables, after they were fetched by the data gathering application 306 and before the information retrieval application 308 extracts results from them. The data cleaning application 112 assumes the data gathering application 306 stores all the pages it fetches on the PAGES database table 410 and all the links between these pages in the LINKS database table 412. The data cleaning application 112 stores the clean set of pages and pagelets on the PAGES 410, LINKS 412, and PAGELETS 414 tables. The information retrieval application 308 thus gets the clean data from these tables. An exemplary scheme for the database tables 408 used by the information retrieval tool is depicted in FIG. 12.

Figure 5:
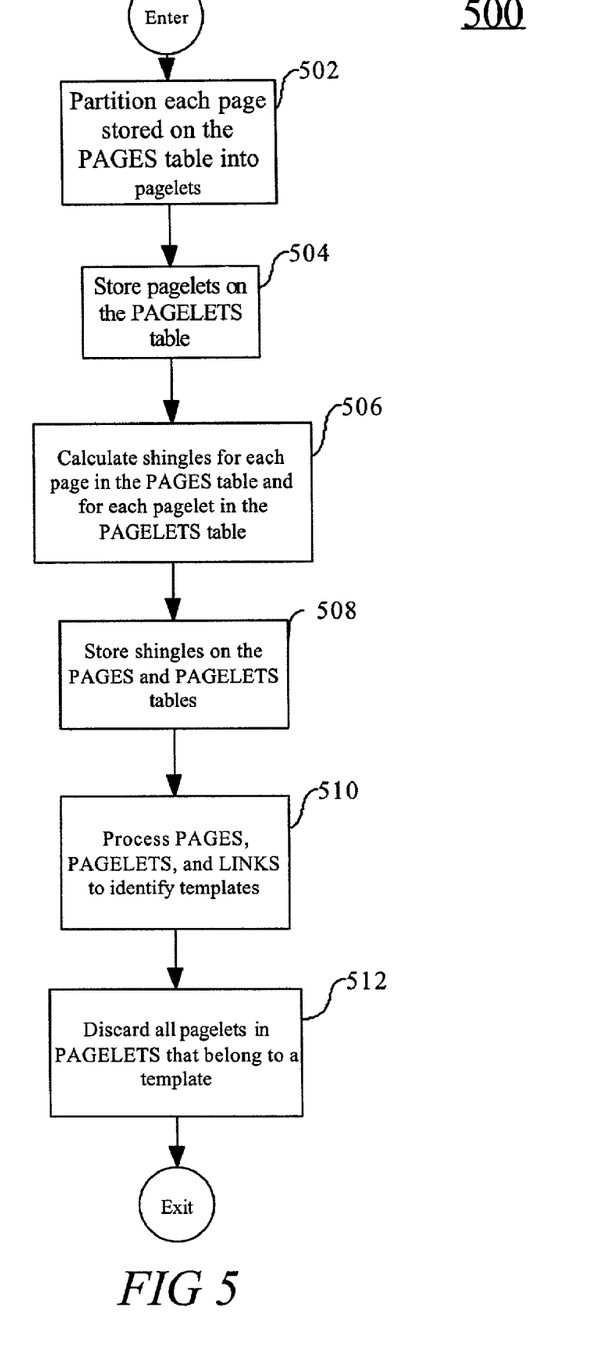
FIGS. 5, 6, 7, and 8 are operational flow diagrams illustrating exemplary operational sequences for the system of FIG. 1, according to a preferred embodiment of the present invention.

FIG. 5 is an exemplary operational flow diagram illustrating the high level operational sequence of the data cleaning application 112. The application starts the sequence at step 502, wherein it invokes the pagelet identifier 310 on each page stored on the PAGES table 410. The pagelet identifier 310, which will be described subsequently, decomposes each given page into a set of pagelets. The application stores, at step 504, all the obtained pagelets on the PAGELETS table 414. The application then invokes the shingle calculator 318, at step 506, to compute a shingle value for each page in the PAGES table 410 and for each pagelet in the PAGELETS table 414. The application stores, at step 508, these shingles in the PAGES 410 and PAGELETS 414 tables respectively. The application invokes, at step 510, the template identifier 314. The template identifier 314, which will be discussed subsequently, processes the PAGES 410, LINKS 412, and PAGELETS 414 tables to identify all the pagelets in the PAGELETS table 414 belonging to a template. The application then discards at step 512 all the pagelets stored on the PAGELETS table 414 that were found to belong to a template.

Figure 9:
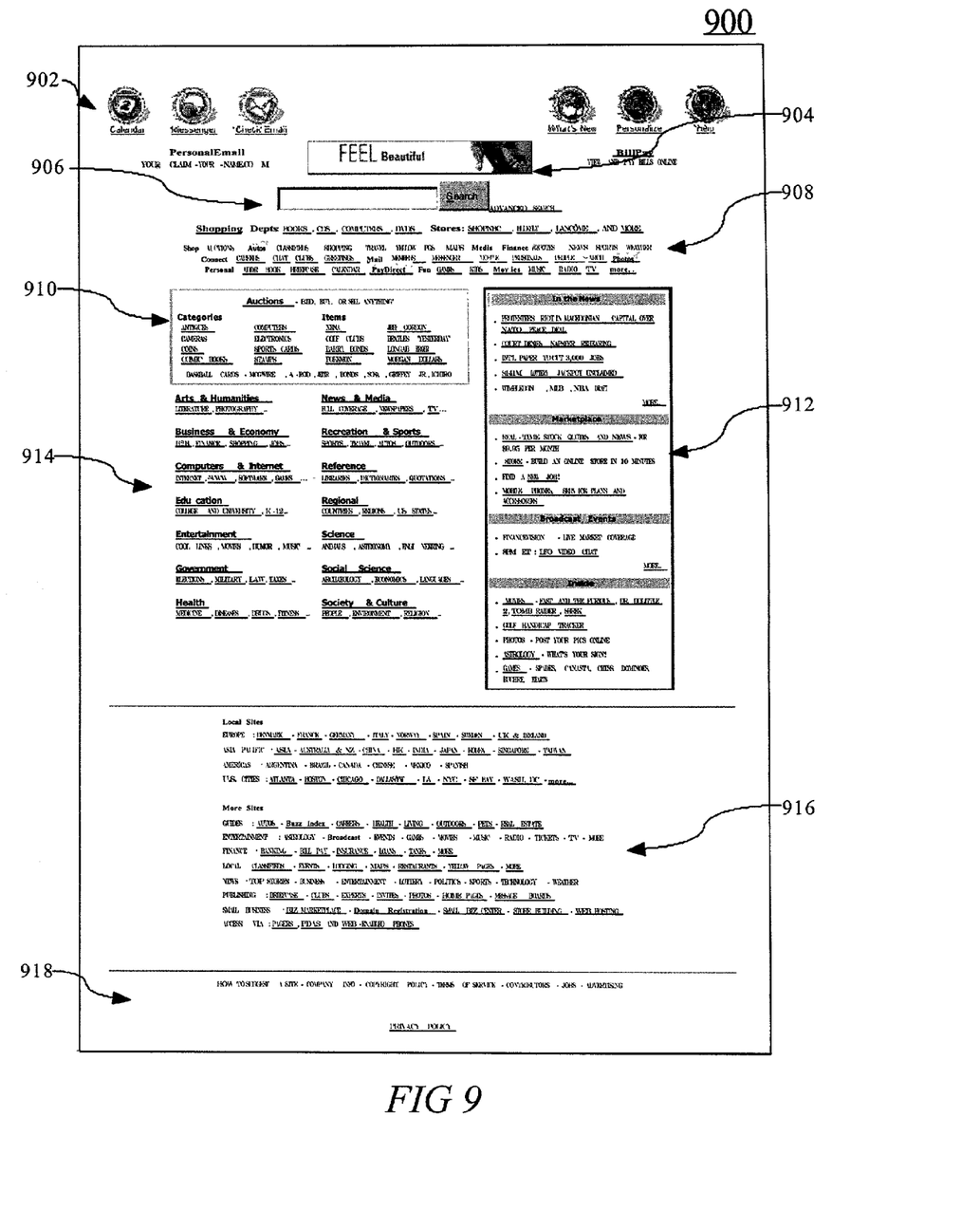
FIG. 9 is an exemplary HTML page showing the concept of the use of pagelets according to a preferred embodiment of the present invention.
Figure 10:
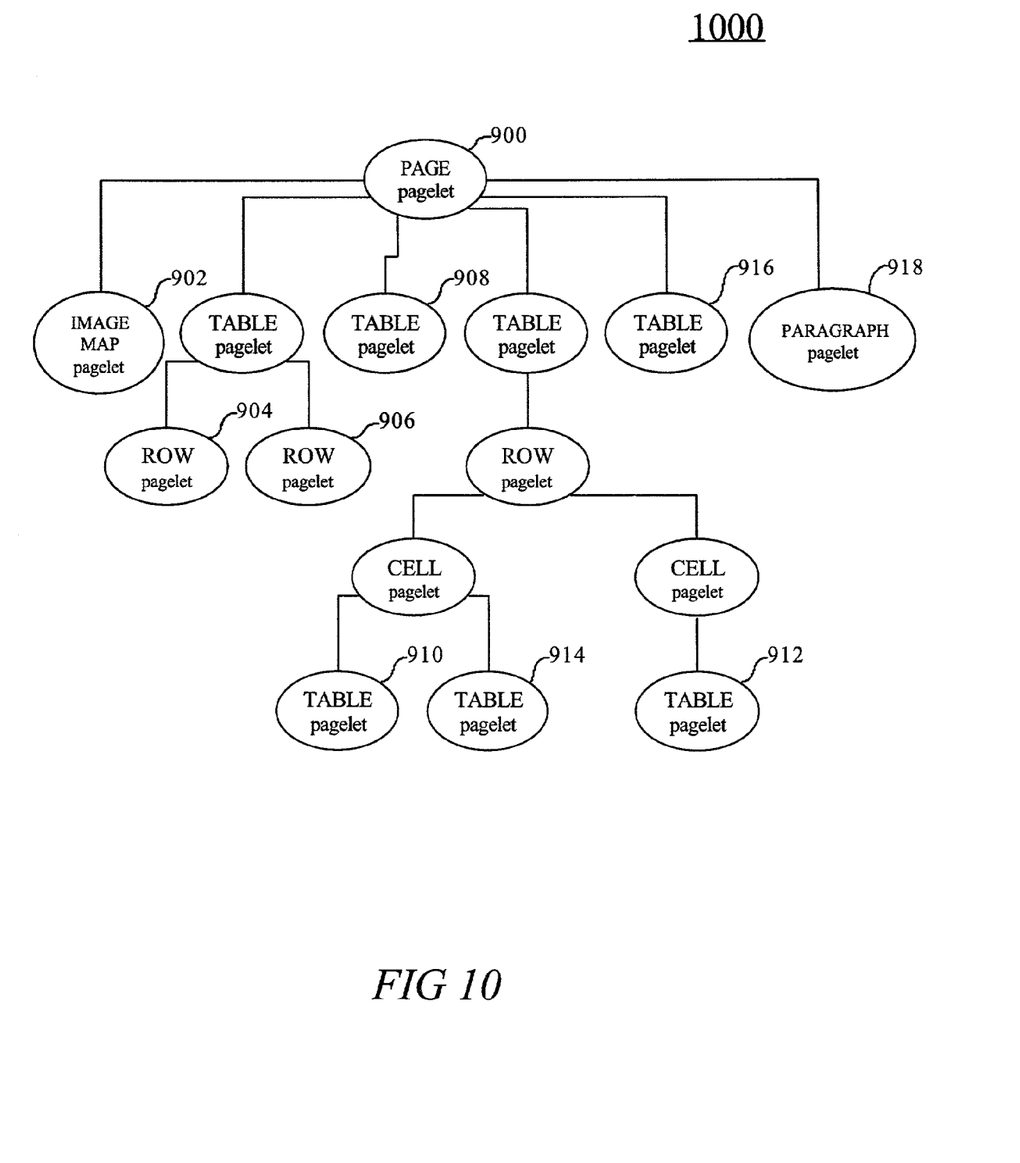
FIG. 10 is an exemplary pagelet tree illustrating the structure of the HTML page of FIG. 9 according to a preferred embodiment of the present invention.

An exemplary HTML page, illustrating the concept of the use of pagelets according to a preferred embodiment of the present invention, is shown in FIG. 9. The HTML page 900 contains numerous sections (pagelets) including a navigational bar pagelet 902, an advertisement pagelet 904, a search pagelet 906, a shopping pagelet 908, an auctions pagelet 910, a news headlines pagelet 912, a directory pagelet 914, a sister sites pagelet 916, and a company info pagelet 918. When the HTML page shown in FIG. 9 is parsed, the resulting pagelet tree of FIG. 10 is produced.

Figure 6:
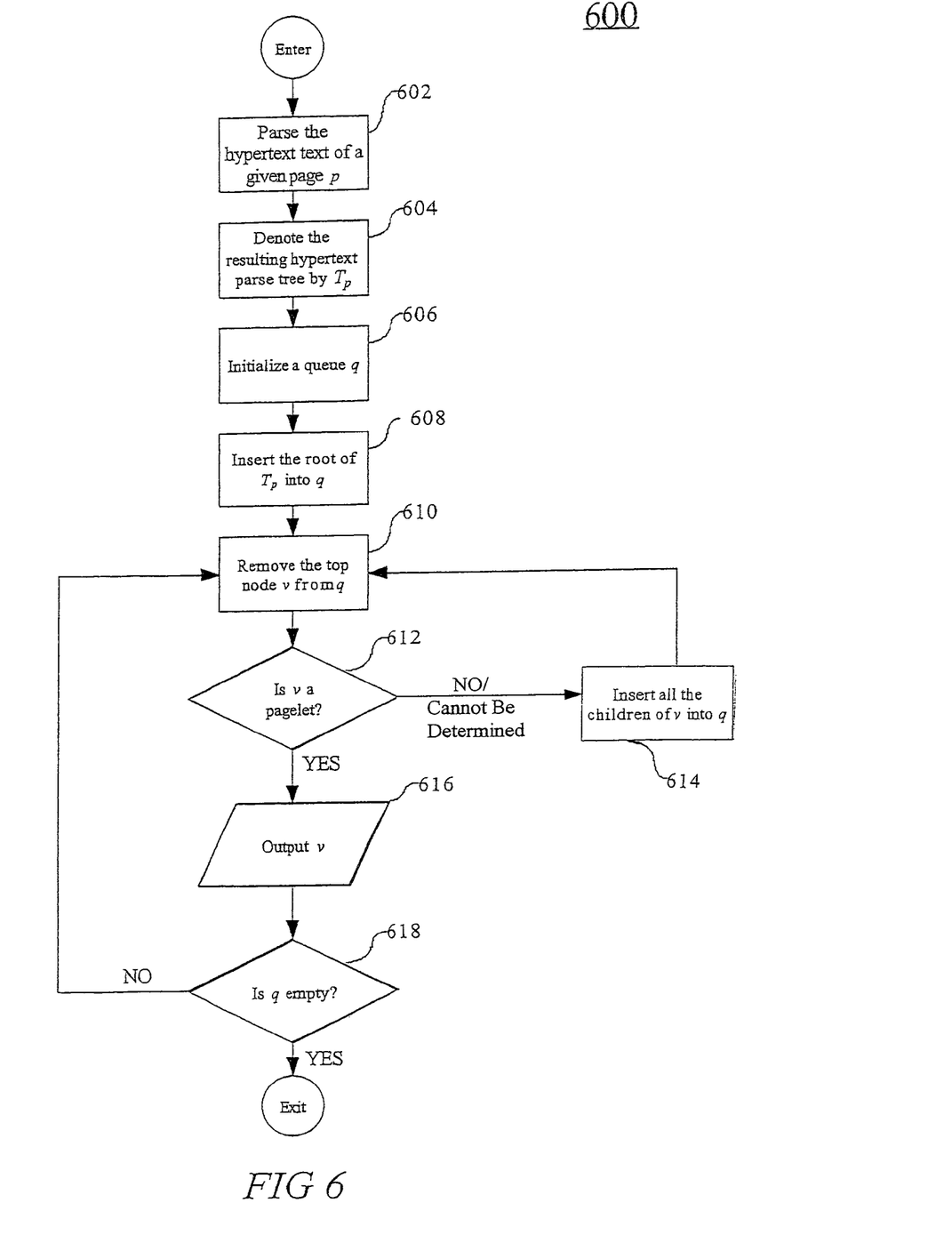

FIG. 6 is an exemplary operational flow diagram illustrating the operational sequence of the pagelet identifier 310. The pagelet identifier 310, in a preferred embodiment, uses a hypertext parser 312 (for example, an HTML parser) at step 602 to parse a given hypertext page p, and to build at step 604 a hypertext parse tree $T_p$ 422 representing this page. It then initializes a queue q 424 of tree nodes. The root node of $T_p$ is inserted into the queue (q) 424 at step 608. The top node (v), at step 610, is removed from the queue (q) 424. This node is examined at step 612 to determine if it is a pagelet. The node v is determined to be a pagelet if it satisfies the following three requirements: (1) its type belongs to a predetermined class of eligible node types (for example, in case the page is HTML, we check that the HTML tag corresponding to the node v is one of the following: a table, a list, a paragraph, an image map, a header, a table row, a table cell, a list item, a selection bar, or a frame); (2) it contains at least a predetermined number of hyperlinks (for example, at least three hyperlinks); and (3) none of its children is a pagelet. If the node v is declared a pagelet, it is output at step 616. Otherwise, all its children are inserted into the queue q 424, at step 614. The process is repeated, at step 618, with each node in the tree ($T_p$) 422 until the queue (q) 424 is empty.

A preferred embodiment of the template identifier 314 is as follows. A template is a collection of pagelets T satisfying the following two requirements:

(1) all the pagelets in T are identical or almost identical; and (2) every two pages owning pagelets in T are reachable one from the other via other pages also owning pagelets in T; the path connecting each such two pages can be undirected.

Figure 11:
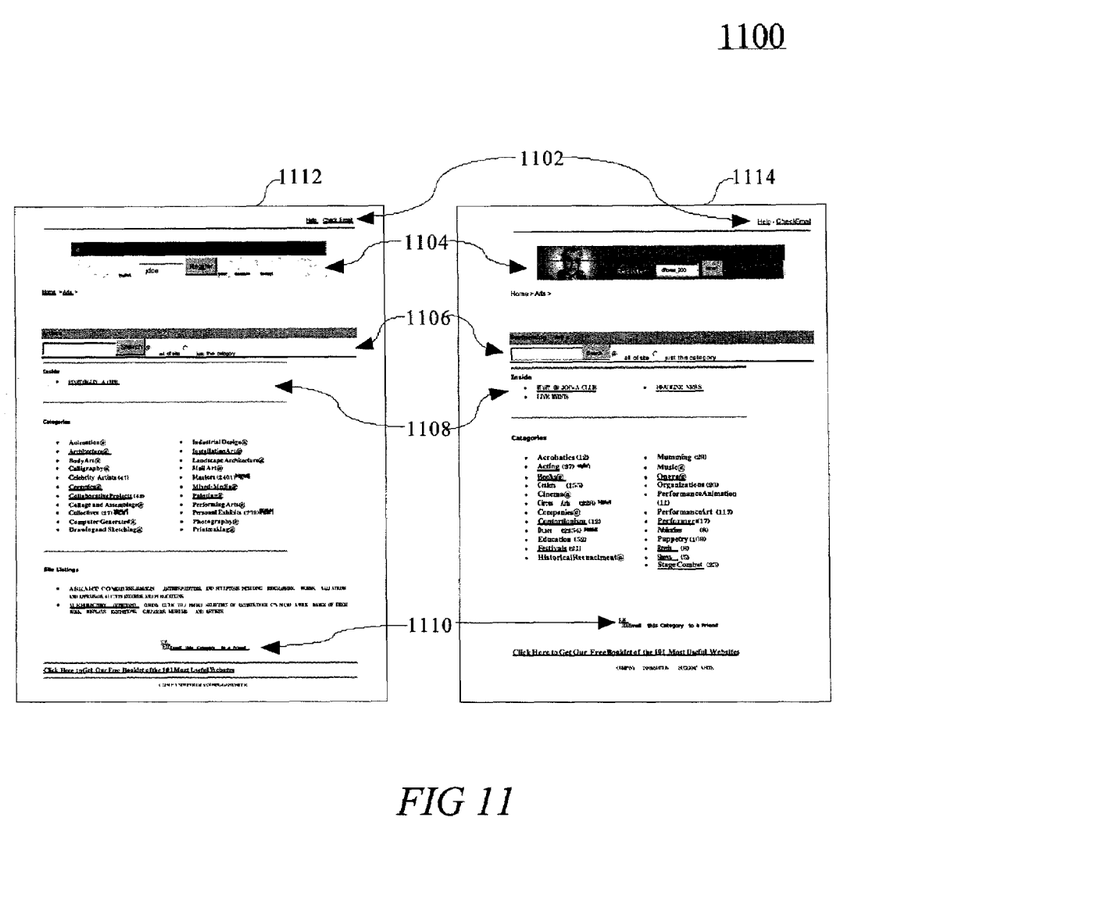
FIG. 11 is an exemplary comparison of two similar HTML pages, illustrating the concept of the use of templates, according to a preferred embodiment of the present invention.

FIG. 11 illustrates the concept of the use of templates in a web site. Two HTML pages 1112, 1114 have been developed using the same templates: a mail template 1102, an advertisement template 1104, a search template 1106, an inside site template 1108, and a company info template 1110.

A preferred embodiment uses the concept of shingling, as taught by U.S. Pat. No. 6,119,124, "Method for Clustering Closely Resembling Data Objects," filed Mar. 26, 1998, the entire teachings of which are hereby incorporated by reference, and applies it to cluster similar pagelets. A shingle is a hash value that is insensitive to small perturbations (i.e. two strings that are almost identical get the same shingle value with a high probability, whereas two very different strings have a low probability of receiving the same shingle value). A shingle calculator 318 calculates shingle values for each pagelet in the PAGELETS table 414 and also for each page in the PAGES table 410.

Figure 7:
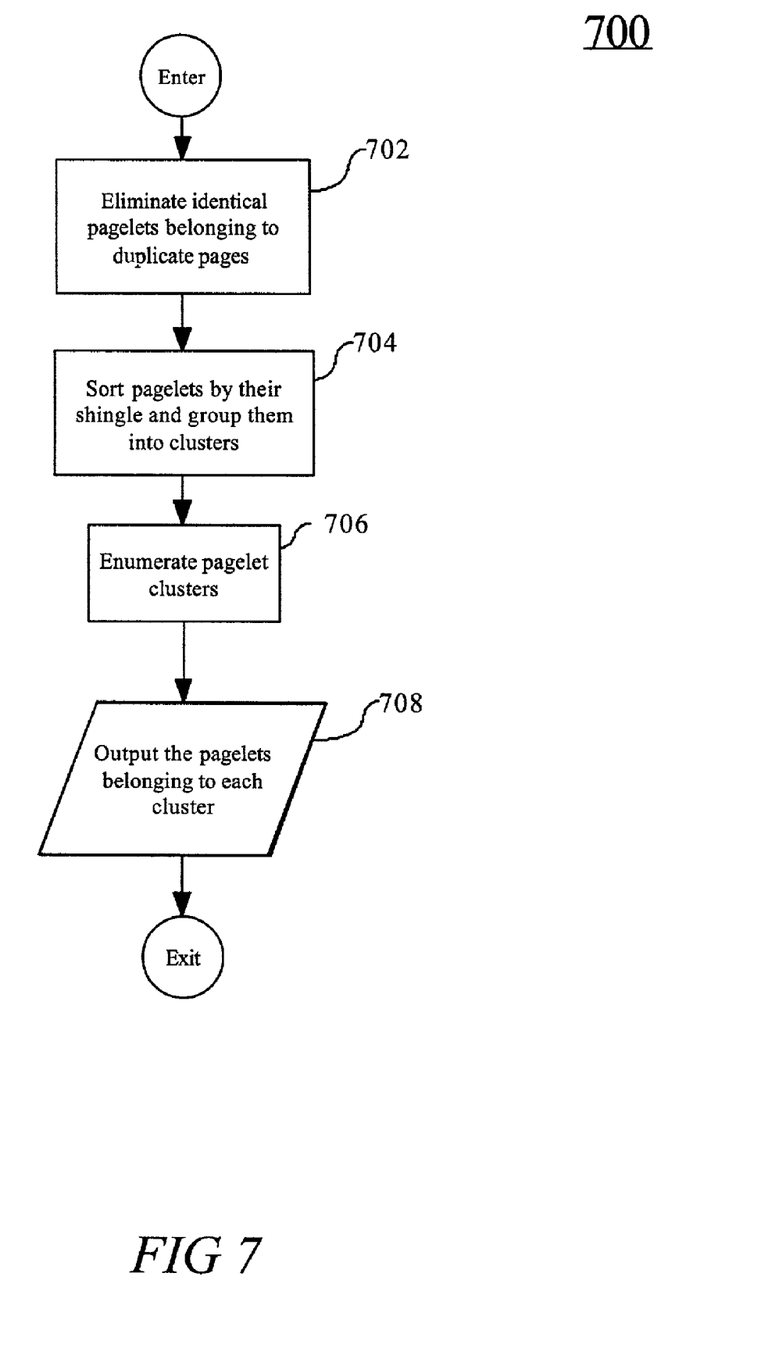
Figure 8:
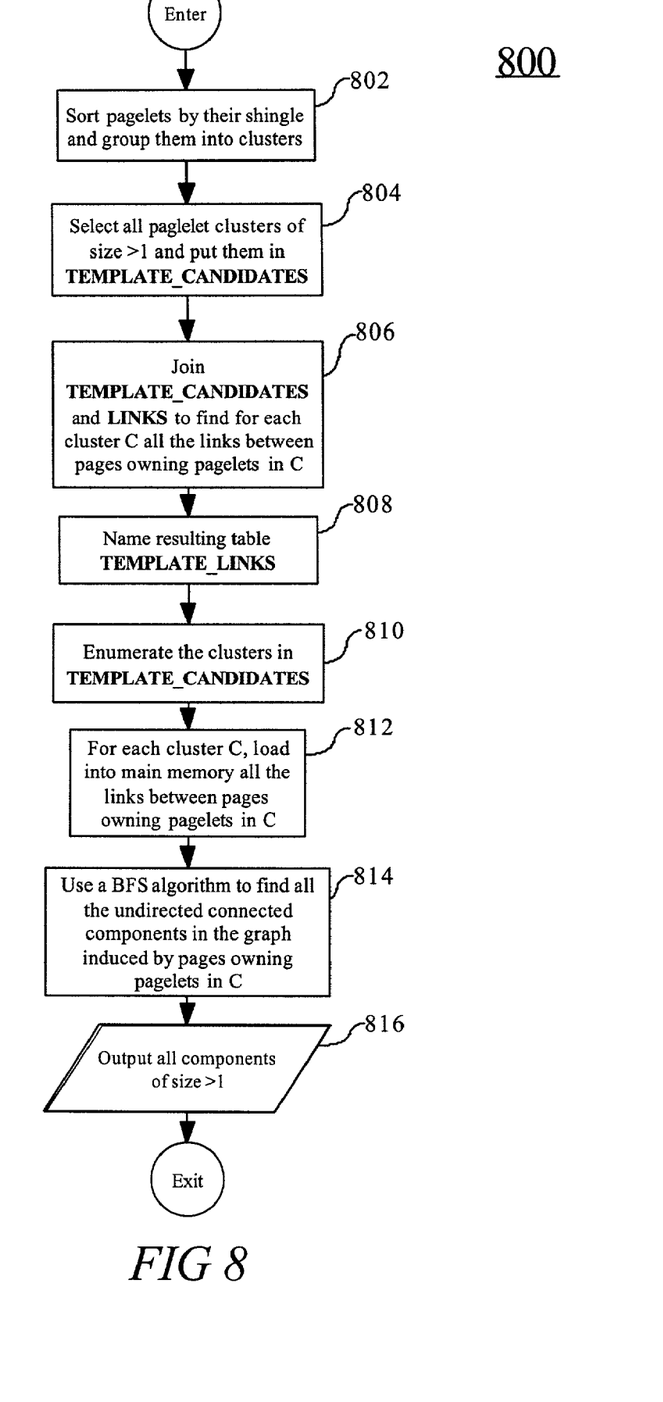

FIGS. 7 and 8 illustrate two exemplary operational sequences for recognizing pagelets belonging to templates in a given set of hypertext documents. The pages in the set and their corresponding pagelets are assumed to be stored on the PAGES 410 and PAGELETS 414 tables. The shingles of these pages and pagelets are assumed to be stored on the database tables too. The hyperlinks between the pages are assumed to be stored on the LINKS table 412.

The exemplary operational sequence shown in FIG. 7 is more suitable for small document sets, which consist only of a small fraction of the documents from the larger universe. In this case the template identifier 314 verifies only the first requirement of the template definition, that is, that all the pagelets in a template are identical or almost identical. The template identifier 314 starts, at step 702, by eliminating identical pagelets that belong to duplicate pages by merging all pagelets that share the same page shingle and pagelet serial. This is done in order to avoid confusing templates with mirrors.

The template identifier 314, at step 704, then sorts the pagelets by their shingle into clusters. Each such cluster contains pagelets sharing the same shingle, and therefore represents a set of pagelets that are identical or almost identical. The template identifier 314 enumerates the clusters at step 706, and outputs the pagelets belonging to each cluster at step 708.

FIG. 8 illustrates an exemplary operational sequence that is well suited for large subsets of the universe. In this case the template identifier 314 verifies both requirements of the template definition. The template identifier 314, at step 802, sorts the pagelets by their shingle into clusters. Each such cluster contains pagelets sharing the same shingle, and therefore represents a set of pagelets that are identical or almost identical. The template identifier 314 selects at step 804 all (the pagelets belonging to) clusters of size greater than 1 and puts them in the TEMPLATE_CANDIDATES 416 table. It then joins, at step 806, TEMPLATE_CANDIDATES 416 and LINKS 412 to find for every cluster C, all the links between pages owning pagelets in C. The resulting table is named TEMPLATE_LINKS 418 at step 808. The template identifier 314 starts to enumerate the clusters at step 810. For each such cluster C, all the links between pages owning pagelets in C are loaded from TEMPLATE_LINKS 418 into main memory at step 812. At step 814, a BFS (Breadth First Search) algorithm 316 is used to find all the undirected connected components in the graph of pages owning pagelets in C. The template identifier 314 then outputs, at step 816, the components of size greater than 1.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method comprising:
cleaning, by operations of a computer system, a set of text documents to minimize violations of a predetermined set of Hypertext Information Retrieval rules by:
decomposing each page of the set of text documents into one or more pagelets;
identifying all pagelets belonging to templates; and
eliminating the template pagelets from a data set, and wherein a template comprises a collection of pagelets T satisfying the following two requirements:
(1) all the pagelets in T are identical or approximately identical; and
(2) every two pages owning pagelets in T are reachable one from the other by at least one of direct access and via a page also owning pagelets in T.

2. The method of claim 1, wherein the set of text documents comprises a collection of HTML pages.

3. The method of claim 1, wherein the decomposing step comprises the steps of:
parsing each text document into a parse tree that comprises at least one node;
traversing the at least one node of the tree;
determining if one of the at least one node comprises a pagelet; and
outputting a representation corresponding to the one of the at least one node if it comprises a pagelet.

4. The method of claim 3, wherein the determining step comprises the steps of:
verifying the node is of a type belonging to a predetermined class of eligible types;
verifying the node contains at least a predetermined number of hyperlinks; and
verifying none of the node's children are pagelets.

5. The method of claim 4, wherein the predetermined class of eligible types comprises at least one of tables, lists, paragraphs, image maps, headers, table rows, table cells, list items, selection bars, and frames.

6. The method of claim 1, wherein the step of identifying all pagelets belonging to templates comprises the steps of:
calculating a shingle value for each page and for each pagelet in the set of documents;
eliminating identical pagelets belonging to duplicate pages;
sorting the pagelets by their shingle value into clusters;
enumerating the clusters; and
outputting a representation corresponding to the pagelets belonging to each cluster.

7. A method comprising:
cleaning, by operations of a computer system, a set of text documents to minimize violations of a predetermined set of Hypertext Information Retrieval rules by:
decomposing each page of the set of text documents into one or more pagelets;
identifying all pagelets belonging to templates; and
eliminating the template pagelets from a data set, and wherein the identifying pagelets belonging to templates comprises:
calculating a shingle value for each page and for each pagelet in the document set;
sorting the pagelets by their shingle value into clusters;
selecting all clusters of size greater than 1;
finding for each cluster all hyperlinks between pages owning pagelets in that cluster;
finding for each cluster all undirected connected components of a graph induced by the pages owning pagelets in that cluster; and outputting a representation corresponding to the components of size greater than 1.

8. A system comprising:
a user interface;
a user interface/event manager communicatively coupled to the user interface;
a generic data gathering application;
a generic information retrieval application, communicatively coupled to the user interface/event manger; and
a data cleaning application, communicatively coupled to the generic data gathering application and to the generic information retrieval application, for:
  decomposing each page of a set of text documents into one or more pagelets;
  identifying all pagelets belonging to templates; and
  eliminating the template pagelets from a data set, and wherein a template comprises a collection of pagelets T satisfying the following two requirements:
  (1) all the pagelets in T are identical or approximately identical; and
  (2) every two pages owning pagelets in T are reachable one from the other by at least one of direct access and via a page also owning pagelets in T.

9. The system of claim 8, further comprising:
a pagelet identifier, communicatively coupled to the data cleaning application;
a hypertext parser, communicatively coupled to the pagelet identifier;
a template identifier, communicatively coupled to the data cleaning application;
a Breadth First Search (BFS) algorithm, communicatively coupled to the template identifier; and
a shingle calculator, communicatively coupled to the data cleaning application.

10. An apparatus comprising:
a user interface;
a user interface/event manager communicatively coupled to the user interface;
a generic data gathering application;
a generic information retrieval application, communicatively coupled to the user interface/event manger; and
a data cleaning application, for:
  decomposing each page of the set of text documents into one or more pagelets;
  identifying all pagelets belonging to templates; and
  eliminating the template pagelets from a data set,
  communicatively coupled to the generic data gathering application and to the generic information retrieval application, and wherein a template comprises a collection of pagelets T satisfying the following two requirements:
  (1) all the pagelets in T are identical or approximately identical; and
  (2) every two pages owning pagelets in T are reachable one from the other by at least one of direct access and via a page also owning pagelets in T.

11. The apparatus of claim 10, further comprising:
a pagelet identifier, communicatively coupled to the data cleaning application;
a hypertext parser, communicatively coupled to the pagelet identifier;
a template identifier, communicatively coupled to the data cleaning application;
a BFS algorithm, communicatively coupled to the template identifier; and
a shingle calculator, communicatively coupled to the data cleaning application.

12. A computer readable medium including computer instructions for driving a user interface, the computer instructions comprising instructions for:
  cleaning, by operations of a computer system, a set of text documents to minimize violations of a predetermined set of Hypertext Information Retrieval rules by
  decomposing each page of the set of text documents into one or more pagelets;
  identifying any pagelets belonging to templates; and
  eliminating the template pagelets from a data set, and wherein a template comprises a collection of pagelets T satisfying the following two requirements:
  (1) all the pagelets in T are identical or approximately identical; and
  (2) every two pages owning pagelets in T are reachable one from the other by at least one of direct access and via a page also owning pagelets in T.

13. The computer readable medium of claim 12, wherein the set of text documents comprises a collection of HTML pages.

14. The computer readable medium of claim 12, wherein the decomposing step comprises the steps of:
  parsing each text document into a parse tree that comprises at least one node;
  traversing the at least one node of the tree;
  determining if one of the at least one node comprises a pagelet; and
  outputting a representation corresponding to the one of the at least one node if it comprises a pagelet.

15. The computer readable medium of claim 14, wherein the determining step comprises the steps of:
  verifying the node is of a type belonging to a predetermined class of eligible types;
  verifying the node contains at least a predetermined number of hyperlinks; and
  verifying none of the node's children are pagelets.

16. The computer readable medium of claim 15, wherein the predetermined class of eligible types comprises at least one of tables, lists, paragraphs, image maps, headers, table rows, table cells, list items, selection bars, and frames.

17. The computer readable medium of claim 12, wherein the step of identifying pagelets belonging to templates comprises the steps of:
  calculating a shingle value for each page and for each pagelet in the set of documents;
  eliminating identical pagelets belonging to duplicate pages;
  sorting the pagelets by their shingle value into clusters;
  enumerating the clusters; and
  outputting a representation corresponding to the pagelets belonging to each cluster.

18. A computer readable medium including computer instructions for driving a user interface, the computer instructions comprising instructions for:
  cleaning, by operations of a computer system, a set of text documents to minimize violations of a predetermined set of Hypertext Information Retrieval rules by
  decomposing each page of the set of text documents into one or more pagelets;
  identifying any pagelets belonging to templates; and
  eliminating the template pagelets from a data set, and wherein the identifying pagelets belonging to templates comprises:
    calculating a shingle value for each page and for each pagelet in the document set;

sorting the pagelets by their shingle value into clusters;
selecting all clusters of size greater than 1;
finding for each cluster all hyperlinks between pages owning pagelets in that cluster;
finding for each cluster all undirected connected components of a graph induced by the pages owning pagelets in that cluster; and
outputting a representation corresponding to the components of size greater than 1, and wherein a template comprises a collection of pagelets T satisfying the following two requirements:
(1) all the pagelets in T are identical or approximately identical; and
(2) every two pages owning pagelets in T are reachable one from the other by at least one of direct access and via a page also owning pagelets in T.

* * * * *